United States Patent [19]
Hawkins et al.

[11] Patent Number: 5,511,144
[45] Date of Patent: Apr. 23, 1996

[54] OPTICAL DISTRIBUTION FRAME

[75] Inventors: Paul D. Hawkins, Arlington, Tex.;
Dulip Ekanayake, Hickory, N.C.;
Daniel S. McGranahan, Fort Worth;
Harley J. Staber, Coppell, both of Tex.

[73] Assignee: Siecor Corporation, Hickory, N.C.

[21] Appl. No.: 259,236

[22] Filed: Jun. 13, 1994

[51] Int. Cl.⁶ .................................................. G02B 6/36
[52] U.S. Cl. ..................... 385/135; 385/136; 385/137; 385/134
[58] Field of Search ........................... 385/135, 134, 385/147, 137, 136

[56] References Cited

U.S. PATENT DOCUMENTS

| | | | |
|---|---|---|---|
| 4,694,488 | 9/1987 | Mickelson et al. | 379/327 |
| 4,840,449 | 6/1989 | Ghandeharizadeh | 385/135 |
| 4,900,123 | 2/1990 | Barlow et al. | 350/96.20 |
| 5,138,688 | 8/1992 | Debortoli | 385/135 |
| 5,142,606 | 8/1992 | Carney et al. | 385/134 |
| 5,167,001 | 11/1992 | Debortoli et al. | 385/135 |
| 5,339,379 | 8/1994 | Kutsch et al. | 385/135 |

FOREIGN PATENT DOCUMENTS 0090103  5/1986  Japan ..................................... 385/147

OTHER PUBLICATIONS

Siecor Corporation publication ICH–12 pub. 1989 no month available.
Siecor Corporation Publication ICH–47 pub. 1993 no month available.
Northern Telecom product information bulletin #91–004 (1991) May.

*Primary Examiner*—Rodney B. Bovernick
*Assistant Examiner*—Yisun Song
*Attorney, Agent, or Firm*—Wesley T. Noah

[57] ABSTRACT

An optical fiber distribution frame including slideable drawers for distributing a large number of optical fibers. In a vertical column of drawers, each drawer has buffer tube storage along its floor and means supporting a removable splice tray and connector shelf in vertical spaced apart relation from the floor of the drawer. Connector sleeve retainers and radius control guides are slideable to maximize unit flexibility.

5 Claims, 6 Drawing Sheets

5,511,144

OPTICAL DISTRIBUTION FRAME

BACKGROUND OF THE INVENTION

The field of the invention is distributing frames for optical telecommunications circuits. Such frames serve as an interface between the central office switching equipment and the cable network of subscriber lines. With the constant increase in the number of subscribers, optimum space utilization for maximum line density is required. Objects of the present invention are to provide a distributing frame allowing high line density, maintaining maximum protection for fiber bend radius, versatility for use of attenuators, jumpers, and spliced cables, and allowing free access to individual lines for reconfiguration.

SUMMARY OF THE INVENTION

The distributing frame according to the invention includes an equipment rack housing a column of spaced apart horizontally slideable drawers. Mounted to the rack on one side of the column of drawers are one or more brackets to which a cable holding one or more buffer tubes containing a plurality of optical fibers can be mounted. Buffer tube slack is stored along the floor of a drawer. The drawers are equipped with upstanding posts on which a removable splice tray and a removable connector shelf may be mounted. Any needed fiber splicing is performed in the splice tray. Fibers proceed from a drawer floor or a splice tray to optical connectors joined in connector sleeves housed in sleeve retainers having a limited sliding range of motion orthogonal to a line containing the row of retainers. Jumpers proceed from the row of retainers to a row of exit radius control guides which are slideable from a first position located a first distance from the row of sleeve retainers to a second position at a distance greater than the first distance to accommodate in-line attenuators or the like to be inserted on a jumper. Jumpers then exit to a plurality of vertical columns of horizontally spaced apart jumper guides, where the jumpers may be segregated in groups for more efficient handling. To allow movement of the drawers, fiber slack storage is accommodated on both entrance and exit sides by means of circular and semicircular spindles fixed to the floor of a drawer.

DETAILED DESCRIPTION OF THE PREFERRED EMBODIMENT

Figure 1:
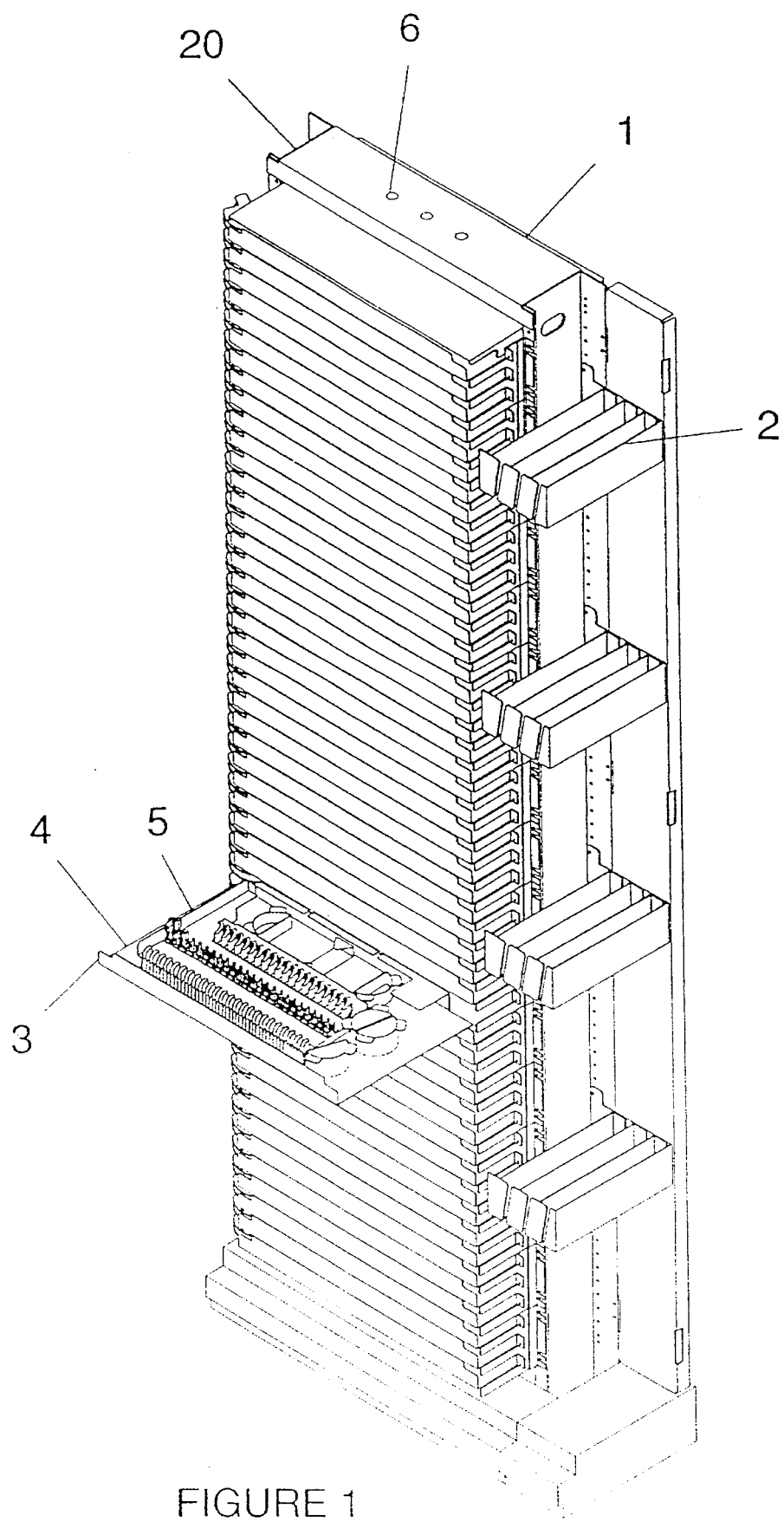
FIG. 1 is a front elevational view of the distributing frame.

Shown in FIG. 1 is a distributing frame 1 according to the invention. On the seven feet tall utility rack 6 is mounted a vertical column of up to seventeen drawer shelves 22 each holding three drawers 4 which may be opened by grasping handles 3. Each drawer 4 accommodates up to twenty-four connectors (including in-line or built-in attenuators) and fusion or mechanical splice trays 13. On rack 6 is also mounted a backplate holding four columns of horizontally spaced apart jumper guides 2.

Drawer shelves are mounted to rack 6 by means of mounting brackets 24, which also serve as the mounting point for cable brackets 17. Outside plant cable 25 is stripped and mounted to bracket 17 by using a metal retention clamp and cable ties. On bracket 17 the cable strength members may be clamped or otherwise secured and a grounding clamp used to ground cable 25 may be installed if necessary. Buffer tubes from cable 25 proceed to an entry guide 7. After the buffer tubes are installed, a V-shaped retainer may be snapped into the space provided on entry guide 7.

Figure 2:
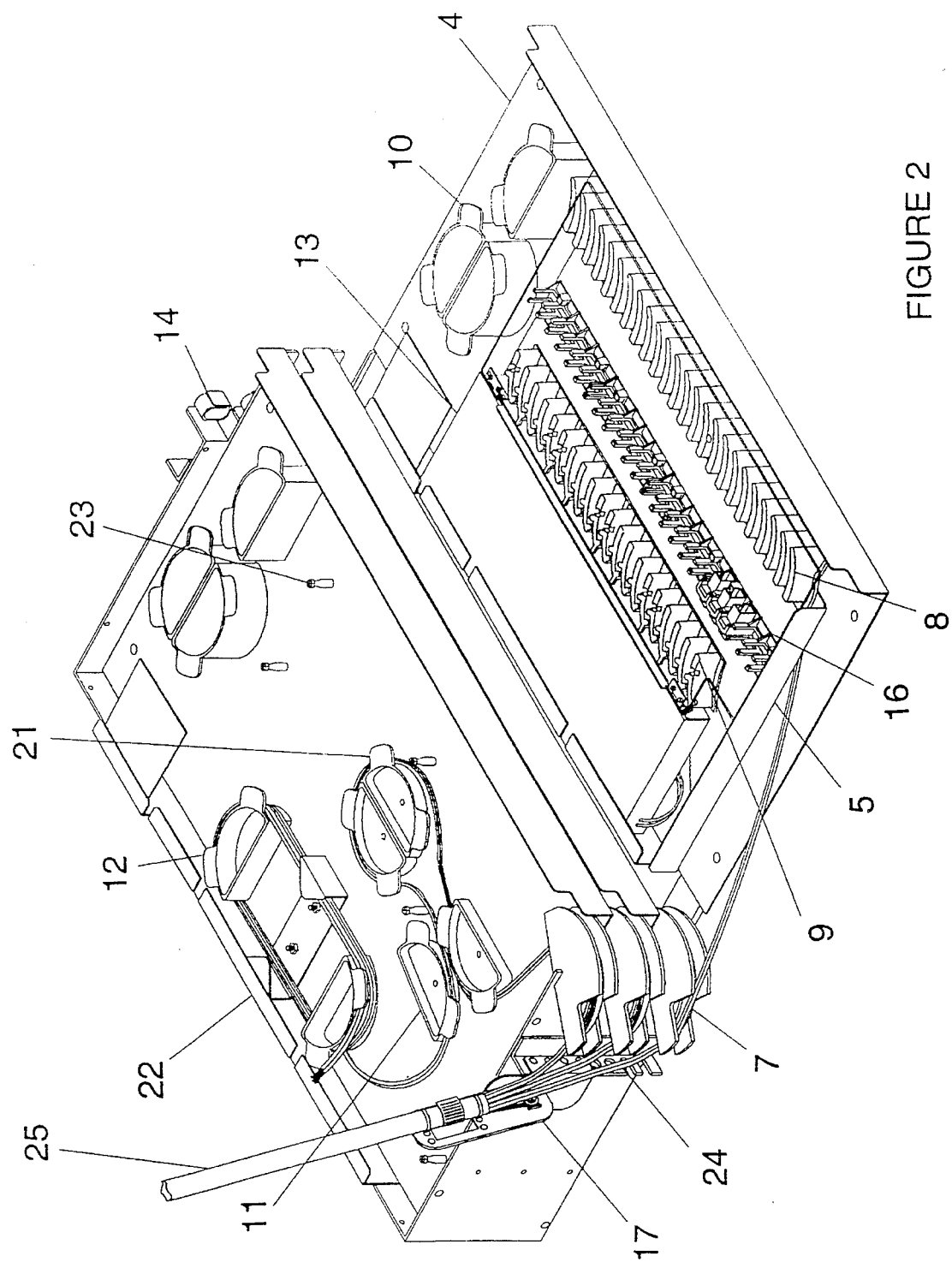
FIG. 2 is top view of a drawer shelf and a cable entering the frame with buffer tubes routed to closed and open drawers.
Figure 3:
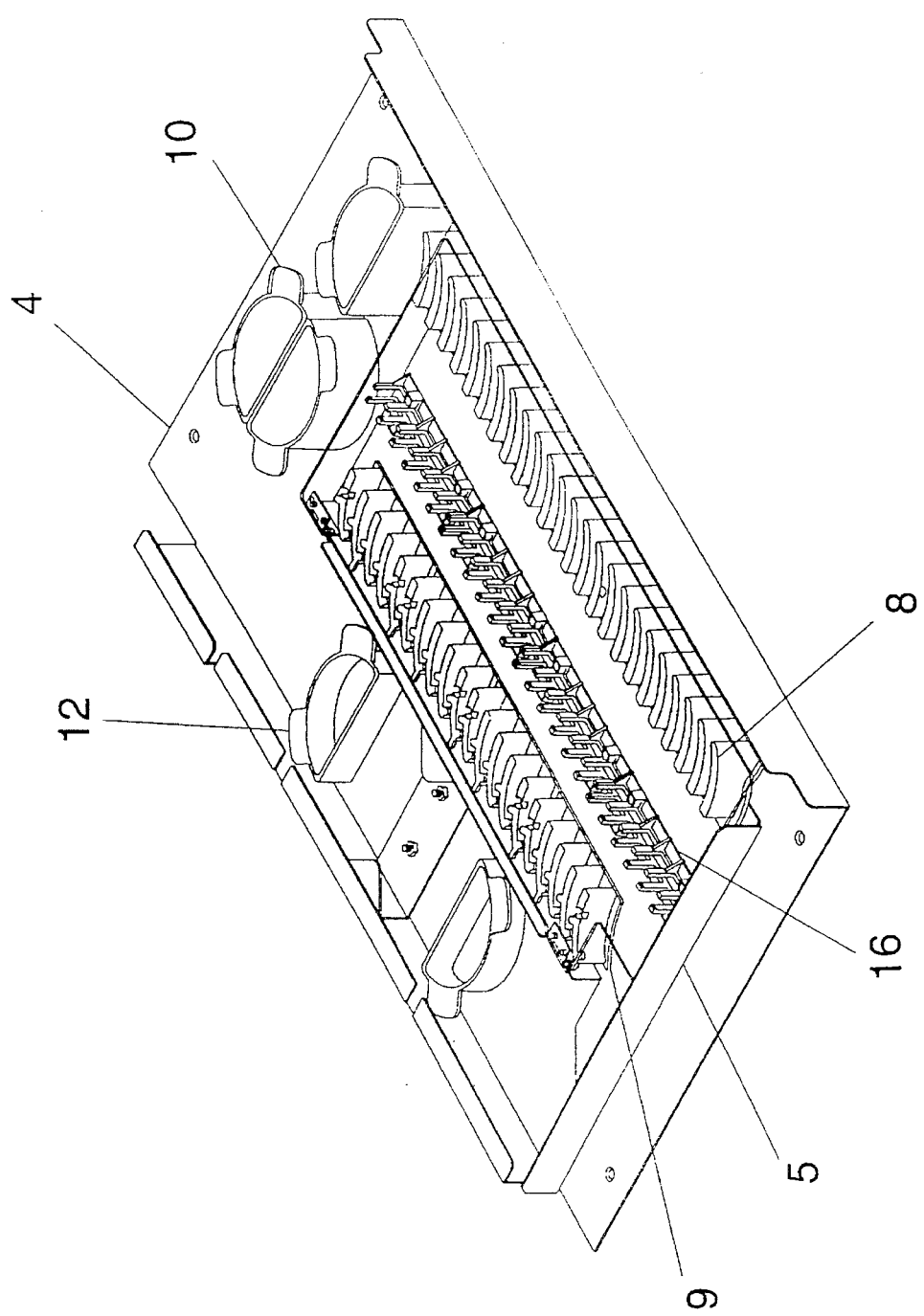
FIG. 3 is a top view of a connector shelf mounted to a drawer.

The buffer tubes proceed from guides 7 between semicircular spindles 11 which are advantageously immovably mounted to the floor of a drawer 4. As a drawer 4 is opened as shown in FIG. 2, buffer tubes are free to transfer from entering along the front semicircular spindle 11 to enter from along the back semicircular spindle. Circular spindle 21, also immovably mounted to the floor of a drawer 4, accommodates slack present as spindles 11 pass entry guide 7 as a drawer 4 is opened. The buffer tubes then proceed from spindles 11 to be wrapped around semicircular storage spindles 12.

Mounted spaced apart from and over the floor of drawer 4 are splice tray 13 and connector shelf 5. Splice tray 13 rests on spindles 12 and is inserted under the lip of horizontally extending flanges provided at the rear of drawer 4. Connector shelf 5 snap fits to the top of split posts 23 extending vertically upward from the floor of a drawer 4. Buffer tubes are unwrapped from spindles 12 to accommodate removal of splice tray 13. Buffer tubes proceed from spindles 12 to splice tray 13 or, if cable 25 is preconnectorized, directly to connector shelf 5.

Figure 4:
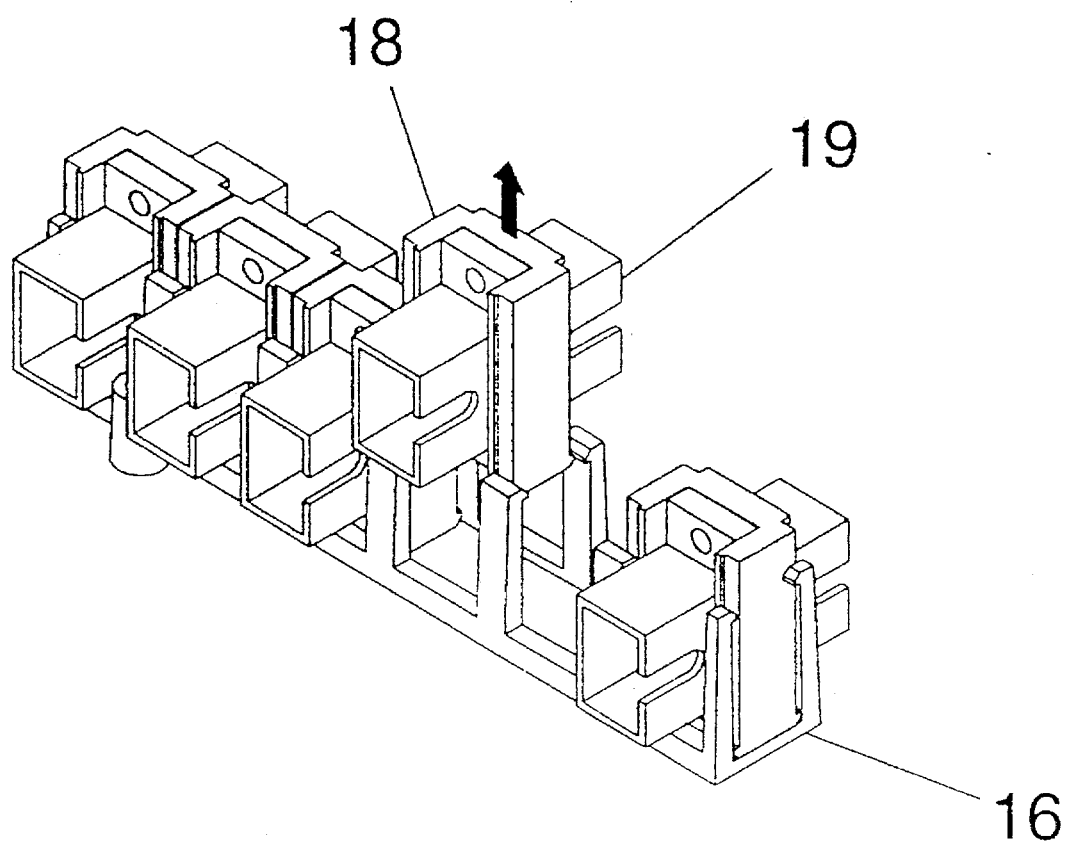
FIG. 4 is a perspective view of a row of slideable connector sleeve retainers.

Pigtails (cables with connectors at only one end) proceed through fiber radius control guides 9 to connectors joined in connector sleeves 19 connector sleeve retainers 18 housed in a row of connector sleeve retainer slides 16 (See FIG. 4). Individual sleeve retainers 18 may be moved by hand in a vertical direction orthogonal to the row of slides 16 as shown by the directional arrow to allow access to individual connectors. Small flanges on the top of slides 16 limit such movement and prevent disengagement of sleeve retainers 18.

Figure 5:
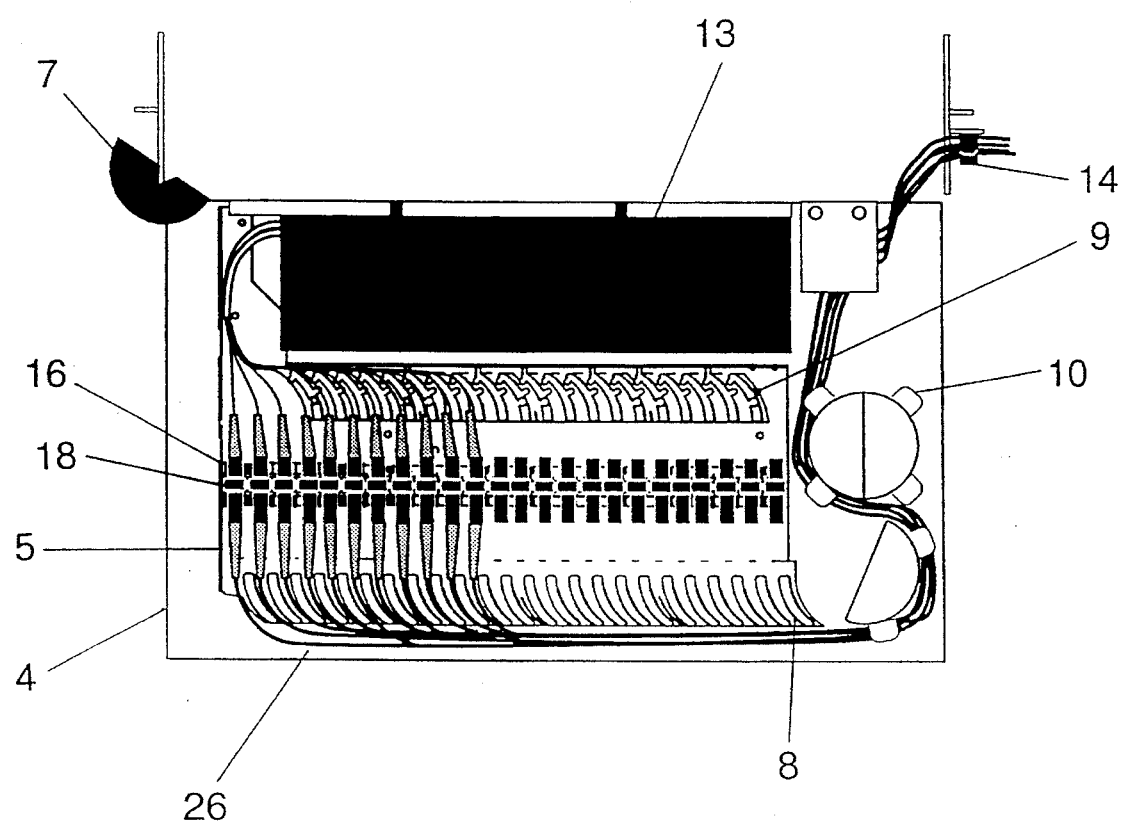
FIG. 5 is a top view of a wired connector shelf.
Figure 6:
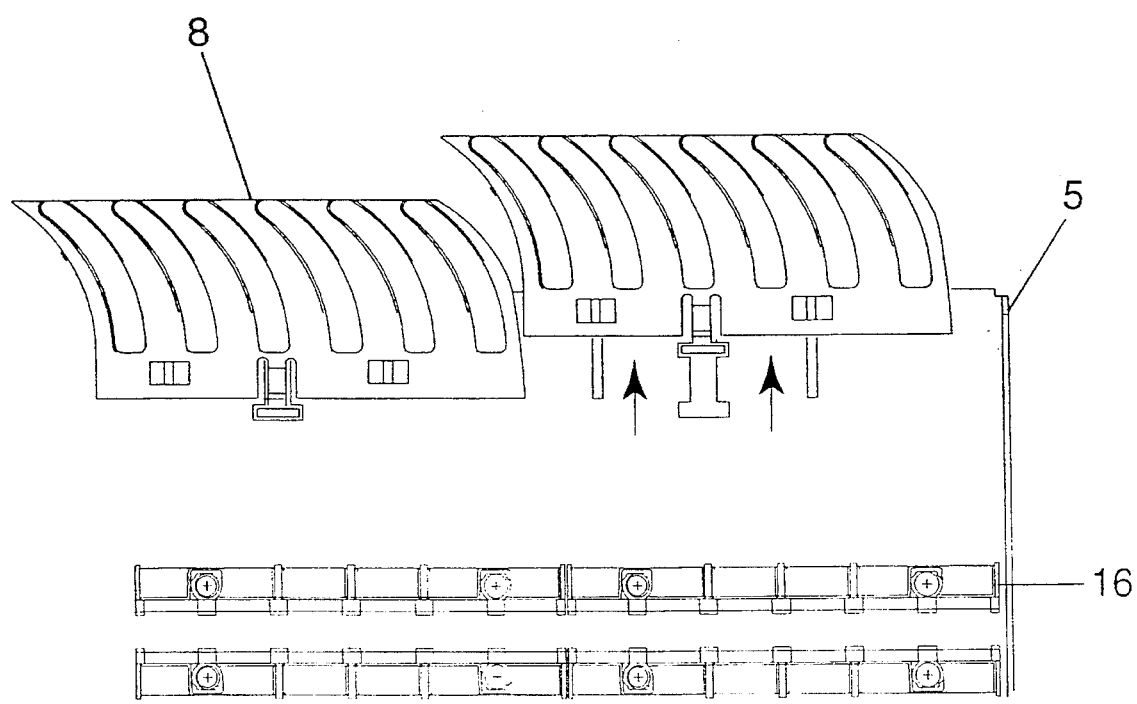
FIG. 6 is a top view of a set of slideable exit jumper retainer guides.

Jumpers exit the row of connectors to jumper radius control guides 8, which are slideable from a first position as shown on the left of FIG. 6 to a second position at a greater distance from slides 16 as shown on the right of FIG. 6 to accommodate insertion of attenuators. Jumpers 26 proceed from guides 8 around exit slack service loop radius guides 10. FIG. 5 shows connector shelf 5 in an open drawer 4. As drawer 4 is closed, jumpers 26 can wrap around the back of circular guide 10. Jumpers 26 then proceed through a securing loop 14 to be routed through jumper guides 2.

What is claimed is:

1. A distributing frame including slideable drawers for optical fibers, comprising:

apparatus for retaining a cable holding a buffer tube containing a plurality of optical fibers;

a column of vertically spaced apart horizontally slideable drawers, at least one drawer having storage means for storing a length of the optical fiber buffer tube along a floor of the drawer and support means holding a removable splice tray and a removable connector shelf in vertically spaced apart relation to said floor of the drawer; and, a linear row of retainer slides mounted to the connector shelf, at least one of said retainer slides allowing a fiber optic connector sleeve retainer housed in said retainer slide a limited sliding range of motion orthogonal to a line containing the row of retainer slides, such range of motion including an extended position in which a portion of the retainer is not enclosed by the slide.

2. A drawer shelf for use in an optical distributing frame, comprising:

a shelf holding a column of vertically spaced apart horizontally slideable drawers, at least one drawer having storage means for storing a length of an optical fiber buffer tube along a floor of the drawer and support means holding a removable splice tray and a removable connector shelf in vertically spaced apart relation to said floor of the drawer; and, a linear row of retainer slides mounted to the connector shelf, at least one of said retainer slides allowing a fiber optic connector sleeve retainer housed in said retainer slide a limited sliding range of motion orthogonal to a line containing the row of retainer slides, such range of motion including an extended position in which a portion of the retainer is not enclosed by the slide.

3. A connector shelf comprising a linear row of fiber optic connector sleeve retainers, at least one retainer housed in a retainer slide allowing the retainer a limited sliding range of motion orthogonal to a line containing the row of retainers, such range of motion including an extended position in which a portion of the retainer is not enclosed by the slide.

4. A distributing frame including slideable drawers for optical fibers, comprising:

apparatus for retaining a cable holding a buffer tube containing a plurality of optical fibers; and, a column of vertically spaced apart horizontally slideable drawers, at least one drawer having storage means for storing a length of the optical fiber buffer tube along a floor of the drawer and support means holding a removable splice tray and a removable connector shelf in vertically spaced apart relation to said floor of the drawer;

the connector shelf comprising a row of fiber optic connector sleeve retainers and a row of radius control guides at a first position located a first distance from the row of retainers, said radius control guides slideable to a second position located a distance from the row of retainers greater than the first distance.

5. A drawer shelf for use in an optical distributing frame, comprising:

a shelf holding a column of vertically spaced apart horizontally slideable drawers, at least one drawer having storage means for storing a length of an optical fiber buffer tube along a floor of the drawer and support means holding a removable splice tray and a removable connector shelf in vertically spaced apart relation to said floor of the drawer; and, a row of fiber optic connector sleeve retainers and a row of radius control guides at a first position located at a first distance from the row of retainers, said radius control guides slideable to a second position located at a distance from the row of retainers greater than the first distance.

* * * * *